United States Patent
Igelman et al.

(10) Patent No.: US 9,679,311 B2
(45) Date of Patent: Jun. 13, 2017

(54) SYSTEM AND METHOD FOR ADDING ADVERTISEMENTS TO A LOCATION-BASED ADVERTISING SYSTEM

(75) Inventors: Marvin Igelman, Thornhill (CA); Aleksandar Zivkovic, North York (CA)

(73) Assignee: Poynt Inc., Concord, Ontario (CA)

( * ) Notice: Subject to any disclaimer, the term of this patent is extended or adjusted under 35 U.S.C. 154(b) by 481 days.

(21) Appl. No.: 12/849,078

(22) Filed: Aug. 3, 2010

(65) Prior Publication Data

US 2011/0119133 A1    May 19, 2011

Related U.S. Application Data

(60) Provisional application No. 61/230,850, filed on Aug. 3, 2009.

(51) Int. Cl.
*G06Q 30/00* (2012.01)
*G06Q 30/02* (2012.01)
(Continued)

(52) U.S. Cl.
CPC ..... *G06Q 30/0261* (2013.01); *H04L 12/1859* (2013.01); *H04L 12/5865* (2013.01);
(Continued)

(58) Field of Classification Search
CPC .................................................. G06Q 30/0261
(Continued)

(56) References Cited

U.S. PATENT DOCUMENTS

| 7,085,818 B2 | 8/2006 | Brown et al. ................ 709/217 |
| 7,593,740 B2 * | 9/2009 | Crowley et al. ........... 455/456.3 |

(Continued)

FOREIGN PATENT DOCUMENTS

| EP | 1197888 | 4/2002 | ............ G06F 17/60 |
| JP | 2006-164256 | 6/2006 | ............ G06F 17/30 |

(Continued)

OTHER PUBLICATIONS

European Patent Office, Extended European Search Report, Application No. 10807004.6-1955/2462550 dated Dec. 22, 2014, 6 pages.
(Continued)

*Primary Examiner* — Matthew L Hamilton
(74) *Attorney, Agent, or Firm* — Sunstein Kann Murphy & Timbers LLP (57) ABSTRACT

A location-based advertising system automatically analyzes messages posted on social networking systems or other publicly accessible or private computer systems for posting messages for viewing by others. The messages are analyzed to identify messages that contain offers, such as offers that may be construed as location-based offers. Information about the offers is extracted from the messages and placed in a database. The database may be used by a location-based advertising application to send advertisements to targeted users or to respond to user who are qualified according to their current or recent geographic location. Optionally or alternatively, merchants may send messages, such as e-mail messages or instant messages (IMs), to the system to notify the system of offers. These messages are also analyzed and information about their respective offers is extracted and placed in the database.

22 Claims, 5 Drawing Sheets

(51) Int. Cl.
*H04L 12/18* (2006.01)
*H04L 12/58* (2006.01)
H04W 4/02 (2009.01)
H04W 4/12 (2009.01)

(52) U.S. Cl.
CPC .............. *H04L 51/20* (2013.01); *H04W 4/02* (2013.01); *H04W 4/12* (2013.01)

(58) Field of Classification Search
USPC .......................................................... 705/14
See application file for complete search history.

(56) References Cited

U.S. PATENT DOCUMENTS

| | | | |
|---|---|---|---|
| 2002/0164977 A1 | 11/2002 | Link, II et al. | 455/414 |
| 2005/0222905 A1 | 10/2005 | Wills | 705/14 |
| 2006/0010108 A1 | 1/2006 | Greenberg | 707/3 |
| 2006/0212466 A1 | 9/2006 | Hyder et al. | 707/101 |
| 2007/0112729 A1 | 5/2007 | Wiseman et al. | 707/3 |
| 2007/0136086 A1* | 6/2007 | Luerssen | 705/1 |
| 2009/0019120 A1 | 1/2009 | Muguda | 709/206 |
| 2010/0030648 A1* | 2/2010 | Manolescu | G06Q 10/0637 705/14.66 |
| 2011/0035284 A1* | 2/2011 | Moshfeghi | G06Q 30/02 705/14.58 |
| 2011/0099070 A1* | 4/2011 | Eliason | G06Q 30/02 705/14.58 |
| 2011/0119130 A1* | 5/2011 | Agan | G06Q 10/10 705/14.49 |

FOREIGN PATENT DOCUMENTS

| | | | |
|---|---|---|---|
| JP | 2008-123062 | 5/2008 | G06F 17/30 |
| JP | 2009-47793 | 3/2009 | G06Q 30/02 |
| KR | 2008-0111175 | 12/2008 | G06Q 30/00 |
| KR | 2009-0000280 | 1/2009 | G06Q 30/00 |
| KR | 2009-0001855 | 1/2009 | H04W 4/02 |
| WO | WO 03/060740 | 7/2003 | G06F 15/16 |

OTHER PUBLICATIONS

Japanese Patent Office, English translation: Notice of Reasons for Rejection for Japanese Application No. 2012-523688 dated Jun. 26, 2013, 3 pages.
Korean Patent Office, In Korean: Notice of Grounds for Rejection for Korean Application No. 2012-7002599 dated Aug. 7, 2013, 6 pages.
Korean Patent Office, English translation: Notice of Grounds for Rejection for Korean Application No. 2012-7002599 dated Aug. 7, 2013, 7 pages.
Australian Patent Office, Patent Examination Report No. 1 for Australian Application No. 2010279620 dated Jan. 31, 2013, 3 pages.
Korean Intellectual Property Office; Authorized Officer: Hong, K., *International Search Report,* International Application No. PCT/US2010/044188, mailed Mar. 17, 2011, 3 pages.
Wikipedia, "*Location Based Advertising*", http://en.wikipedia.org/wiki/Location_based_advertising, Jul. 30, 2009, 4 pages.
Steiniger, et al., "*Foundations of Location Based Services*", CartouCHe—Lecture Notes on LBS, V. 1.0, 28 pages, 2006.
Wikipedia, "*Location-based service*", http://en.wikipedia.org/wiki/Location-based_service, Jul. 30, 2009, 5 pages.
iList Micro, "*Search the Twitter marketplace*", http://micro.ilist.com/, Jul. 30, 2009, 1 page.
iList Micro, "*We're the dudes\* behind iList Micro*", http://micro.ilist.com/about, Jul. 30, 2009, 2 pages.
Japanese Patent Office, In Japanese: Notice of Reasons for Rejection for Japanese Application No. 2012-523688 dated Jun. 26, 2013, 3 pages.

\* cited by examiner

UniMobi LBS Advertising

From: Al@AcmeOffice.com —404

Sent: Tuesday, July 28, 2009   1:19PM

To: Ads@UniMobi.com —403

Subj: Location-based advertisement —406

Free toner cartridge with purchase of a case or more of printer paper. —413                          —416
Notify users within one mile.   # LBSAD.—
                                                                    400
Acme Office Supply   ——405
125 Main St.
Boston, MA 02110  }—410
617-555-1212

SYSTEM AND METHOD FOR ADDING ADVERTISEMENTS TO A LOCATION-BASED ADVERTISING SYSTEM

CROSS REFERENCE TO RELATED APPLICATIONS

This application claims the benefit of U.S. Provisional Patent Application No. 61/230,850, filed Aug. 3, 2009, titled "System and Method for Adding Advertisements to a Location-Based Advertising System," the entire contents of which are hereby incorporated by reference herein, for all purposes.

TECHNICAL FIELD

The present invention relates to location-based advertising systems and, more particularly, to methods and systems for adding advertisements to such systems.

BACKGROUND ART

Conventional computerized location-based advertising (LBA) systems automatically deliver targeted contents, such as advertisements, offers, notices and the like (collectively herein referred to as "advertisements"), to users when the users are found within predefined geographic regions. A typical LBA system includes a database that stores information about the advertisements, including information defining a geographic region, such as a predefined area around a given merchant's store, associated with each advertisement. The database may also store information that enables the LBA system to target users who are likely to be interested in, or respond to, the advertisements. For example, for each advertisement, the database may store a target income range or a list of hobbies. The database may also store user profile information, such as interests, demographics, recent purchases and the like.

Each user's location is monitored in real time or in near real time. For example, many mobile telephones include a global positioning system (GPS) or other location-determining components. In some cases, the user's location is determined by a communication network component instead of, or in cooperation with, a component within the mobile telephone. In either case, when a user enters, or is found in, the geographic region associated with an advertisement, and optionally the user's profile matches the advertisement's target audience, the LBA system automatically sends a message to the user. For example, the message may be a short message service (SMS) message, i.e. a text message, that includes a coupon for a free or discounted product offered by a particular merchant located near the user. The SMS message may be sent to the user's mobile telephone.

Operators of LBA systems solicit merchants to advertise on their LBA systems in much the same way print advertisers, such as so-called "yellow pages" book publishers, solicit accounts. That is, account representatives contact potential advertisers, or merchants contact the account representatives, and the parties exchange information, often via postal mail or over the telephone call, and then the account representative manually enters appropriate information into the LBA system. This labor-intensive process contributes to the high cost of location-based ("LB") advertising. Consequently, many small businesses, non-profit organizations and individuals can not afford to use such advertising. Furthermore, the time required to contract with an LBA provider, define geographic area(s) and message contents, etc. precludes quickly setting up an LBA advertising campaign. Thus, advertisers with short time-frame campaigns can not take advantage of LBA as a vehicle for delivering their advertisements.

SUMMARY OF EMBODIMENTS

An embodiment of the present invention provides a computer-implemented method for automatically notifying a user of an offer. At least part of a first electronic message is analyzed for an indication the message contains information related to an offer. The message may be, for example, a message posted on a social networking system or a text message, such as an e-mail message or an instant message sent to a location-based advertising system.

A description of the offer is determined from the message. The description may, but need not, include contents selectively copied from the message. The description may, but need not, include the entire contents of the message. For example, the description may include price, name of a merchant or condition of the offer. The description may be generated so as to form an abstract or rephrasing or paraphrasing of all or part of the message. For example, if a dishwasher is offered for sale, the description may refer to a "kitchen appliance."

A geographic location associated with the offer is automatically determined. The geographic location may be explicitly stated in the message, or the geographic location may be implied by information in the message, such as in a "from" address of the message or by metadata, such as a hashtag. Other examples of information that indicates a geographic location include a merchant name, a street address, a city, a state, a ZIP code, all or part of a telephone number, a merchant number, geographic coordinates, an intersection, a neighborhood name or a landmark.

Data, including the description of the offer and data indicative of the geographic location of the offer, are automatically stored in a computerized database.

Electronic data indicative of a geographic location of a user is received. This data may be automatically sent, i.e., without requiring the user to initiate the sending of the data, such as by a mobile telephone system as the user travels about. On the other hand, the user may enter her geographic location, such as into an application program being executed by a mobile communication device or a personal computer or into a form displayed by a browser. The geographic location may be the user's present location or a geographic location of interest, such as a geographic location to which the user plans to travel in the future (collectively referred to as "a geographic location of a user").

The user is automatically qualified, based at least in part on proximity of the geographic location of the user to the geographic location associated with the offer. If the user is qualified, a second electronic message is automatically sent to the user. The second electronic message contains at least a portion of the description of the offer.

As noted, the message that is analyzed for an indication that it contains information related to an offer may be a message posted on a social networking system. In this case, before analyzing the message, the social networking system may be automatically queried, such as by simulating a browser request, for data from the social networking system or via an application programming interface (API) provided by the social networking system. At least part of a message posted on the social networking computer system is received. The received part of the message is then used as the first electronic message, i.e., at least part of the received message is analyzed for an indication that it contains information related to an offer.

Optionally or alternatively, as noted, the message that is analyzed for an indication that it contains information related to an offer may be a text message. In this case, before analyzing the message, the message is received, such as by a mailbox module.

Automatically analyzing the message for an indication the message contains information related to an offer may include automatically searching text of the message for at least one predefined word or automatically searching the message for a predefined hashtag or automatically searching the message for an element of predefined metadata.

Automatically determining the geographic location associated with the offer may include automatically searching text of the message for a word indicative of a geographic location. Optionally or alternatively, determining the geographic location may include querying a database with information from the message and receiving location data returned by the database in response to the query.

Optionally or alternatively, determining the geographic location may include iterative use of one or more databases. For example, determining the geographic location may include sending a first query to a first database with information from the message and receiving first information about an originator of the first electronic message returned by the first database in response to the first query. Then, a second database may be queried with at least part of the received first information and location data returned by the second database in response to the second query may be received. For example, a name of a merchant or a telephone number included in the message may be used to query a first database to determine the merchant's or the telephone number's geographic location. Optionally, information from the first database may be used to access a second database. For example, having found a name of a person or business associated with a telephone number in the first database, the name may be used to access the second database to determine a geographic location of the telephone number. (The first and second databases can be separate databases or they can be the same database.)

Automatically sending the second electronic message to the user may include sending a text message, such as an e-mail message or an instant message, to a mobile communication device of the user. Optionally or alternatively, sending the second electronic message to the user may include automatically responding to an electronic query by the user, such as by responding to a query made by the user via a web page or via an application program executed by the user's mobile communication device.

Another embodiment of the present invention provides a computer-based system for automatically notifying a user of an offer. The system includes a message analyzer configured to automatically analyze at least part of a first electronic message for an indication the message contains information related to an offer. The message may be, for example, a message posted on a social networking computer system or a message addressed to the system. For example, the message may be an e-mail message or an instant message.

The message analyzer is also configured to automatically determine a description of the offer from the message and to automatically determine a geographic location associated with the offer. The message analyzer is configured to automatically store the description of the offer and data indicative of the geographic location of the offer in a computerized database.

The system also includes a user qualifier configured to receive electronic data indicative of a geographic location of a user. The user qualifier is also configured to automatically determine qualification of the user, based at least in part on proximity of the geographic location of the user to the geographic location associated with the offer.

The system further includes a message generator. If the user is qualified, the message generator automatically sends a second electronic message to the user. The second message contains at least a portion of the description of the offer.

The message analyzer may be further configured to automatically query a social networking computer system and receive at least part of a message posted on the social networking computer system. The received part of the message is then used as the first electronic message, i.e., at least part of the received message is analyzed for an indication that it contains information related to an offer.

Optionally or alternatively, as noted, the message that is analyzed for an indication that it contains information related to an offer may be a text message. In this case, the message analyzer is configured to receive the text message, which is then analyzed for an indication that it contains information related to an offer.

In order to automatically analyze the first message for an indication the first message contains information related to an offer, the message analyzer may be configured to automatically search text of the first message for at least one predefined word or to automatically search the first message for at least one predefined hashtag or to automatically search the first message for at least one element of predefined metadata.

The message analyzer may be configured to automatically search text of the first message for at least one word indicative of a geographic location.

In order to automatically determine the geographic location associated with the offer, the message analyzer may be configured to query a database with information from the first electronic message and receive location data returned by the database in response to the query.

In order to automatically determine the geographic location associated with the offer, the message analyzer may be configured to send a first query to a first database with information from the first electronic message and receive first information about an originator of the first electronic message returned by the first database in response to the first query. The message analyzer may then send a second querying to a second database with at least part of the received first information and receive location data returned by the second database in response to the second query. (The first and second databases may be distinct databases, or they may be the same database.)

The second electronic message may be a text message to a mobile communication device of the user. Optionally or alternatively, the second electronic message may be a message sent in response to a query by the user, such as a response to a query made by the user via a web page or via an application program executed by the user's mobile communication device.

Yet another embodiment of the present invention provides a computer program product for use on a computer system for automatically notifying a user of an offer. The computer program product includes a tangible non-transitory computer usable medium. Computer readable program code is stored on the medium. The computer readable program code includes program code configured to automatically analyze at least part of a first electronic message for an indication the first electronic message contains information related to an offer. The program code is also configured to automatically determine a description of the offer from the first electronic message and to automatically determine a geographic location associated with the offer. The program code is also configured to automatically store data in a database. The data includes the description of the offer and data indicative of the geographic location of the offer.

The program code is also configured to receive electronic data indicative of a geographic location of a user and to automatically determine qualification of the user. The qualification determination is based at least in part on proximity of the geographic location of the user to the geographic location associated with the offer. If the user is qualified, the program code is configured to automatically send a second electronic message to the user. The second electronic message contains at least a portion of the description of the offer.

An embodiment of the present invention provides a computer program product for use on a computer system for automatically notifying a user of an offer. The computer program product includes a tangible non-transitory computer usable medium. Computer readable program code is stored on the medium. The computer readable program code includes a message analyzer, a user qualifier and a message generator.

The message analyzer is configured to automatically analyze at least part of a first electronic message for an indication the first electronic message contains information related to an offer. The message analyzer is also configured to automatically determine a description of the offer from the first electronic message and to automatically determine a geographic location associated with the offer. The message analyzer is configured to automatically store the description of the offer and data indicative of the geographic location of the offer in a database.

The user qualifier is configured to receive electronic data indicative of a geographic location of a user and to automatically determine qualification of the user. The qualification is based at least in part on proximity of the geographic location of the user to the geographic location associated with the offer.

The message generator is configured to, if the user is qualified, automatically send a second electronic message to the user. The second electronic message contains at least a portion of the description of the offer.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide computer-implemented methods and apparatus for automatically adding entries to a location-based advertisement (LBA) database and notifying a user of an offer based on an automatically-determined geographic location of the user and the user's proximity to a geographic location associated with the offer. These embodiments automatically analyze messages that have been posted by merchants on social networking systems, such as Twitter, to identify messages that contain offers, including offers that may be construed as location-based offers. Information about the offers is automatically extracted from the messages and placed in the LBA database. The LBA database may be used by a location-based (LB) advertising application computer program to automatically send advertisements to targeted users, based on the users' then-current or last known locations. Users may also query the LBA database for offers that match selection criteria provided by the users. Optionally or alternatively, merchants may send messages, such as e-mail messages or instant messages (IMs), to a system (referred to herein as an "LBA system") associated with the LBA database to notify the system of location-based offers. These messages are also automatically analyzed and information about their respective offers is automatically extracted and placed into the LBA database.

Figure 1:
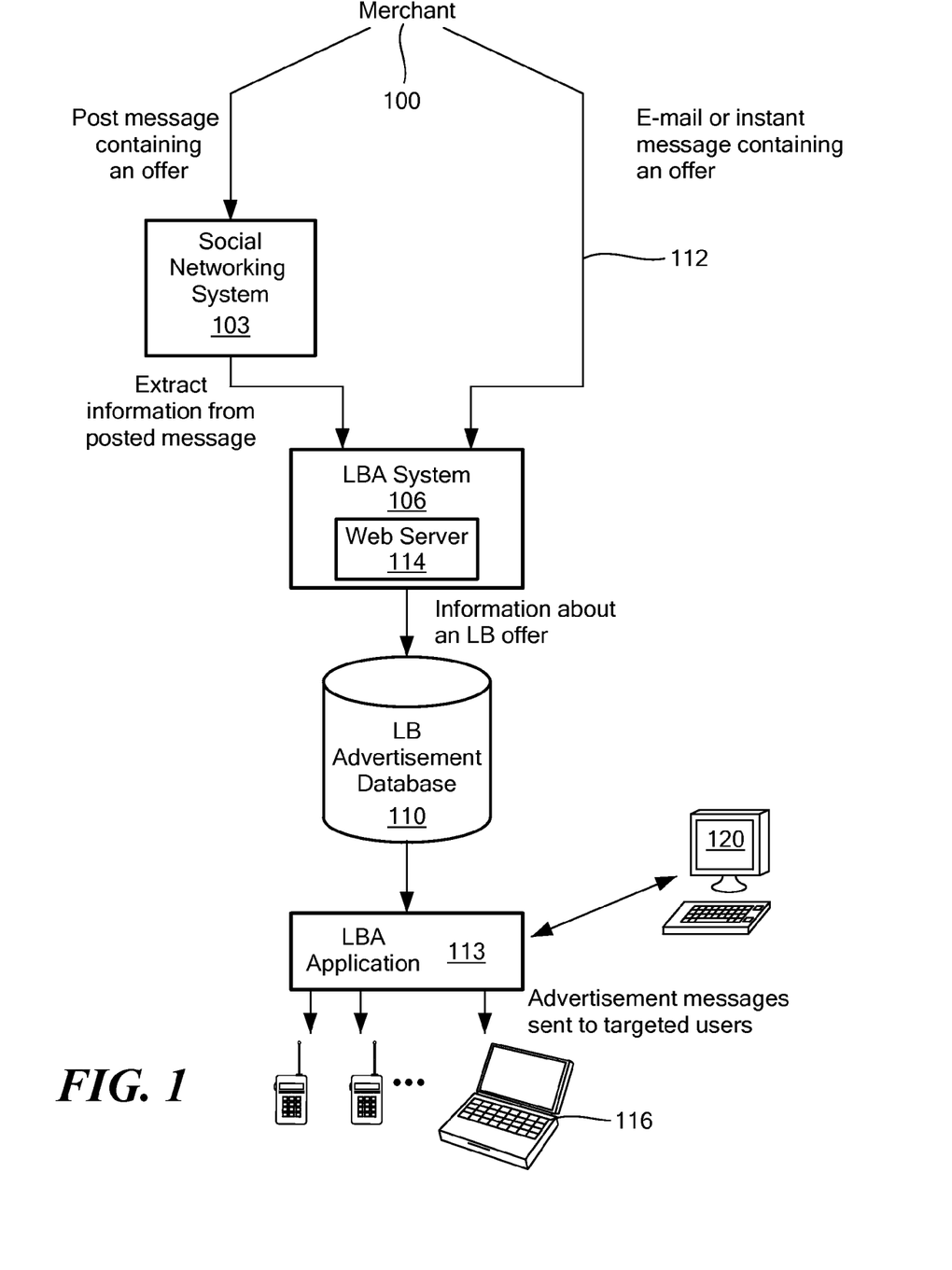
FIG. 1 is a schematic block diagram that provides an overview of operation of an embodiment of the present invention.

FIG. 1 contains a block diagram that provides an overview of operation of an embodiment of the present invention. A merchant 100 may post a message (commonly known as a "Tweet" on Twitter) containing an offer on a social networking system 103. An LBA system 106 automatically scans the social networking system 103 and extracts information from messages that may be construed as containing offers, including location-based offers. The scans may occur at fixed or variable intervals and/or the scans may occur automatically in response to events, such as notifications from the social networking system 103 indicating that new messages have been posted. The LBA system 106 stores the extracted information in a location-based advertisement database 110.

Optionally or alternatively, as indicated at 112, the merchant 100 may send an e-mail message, an IM or another type of message to the LBA system 106, where the message contains information about an offer. The LBA system 106 automatically extracts information from the message and stores the extracted information in the location-based advertisement database 110.

An LBA application 113, which may be part of or separate from the LBA system 106, uses information in the location-based advertisement database 110 to automatically generate and send advertisement messages to targeted users 116, such as users that are found to be located proximate the merchant's place of business. Optionally or alternatively, second users 120 may query or search the location-based advertisement database 110, such as by providing selection criteria to the LBA application 113. The LBA application may include a web server 114 to facilitate the query or search and to provide results.

Thus, a merchant may make use of the LBA system 106 by posting a message with appropriate contents on a social network system 103 or by sending such a message to the LBA system 106. Consequently, the merchant may have almost immediate access to location-based advertising, without the time and expense conventionally associated with engaging an advertising agency and setting up a location-based advertising campaign. A more detailed description of the exemplary LBA system 106 will now be provided.

As noted, the LBA system 106 may analyze a message posted to a social networking system 103 or a message sent to the LBA system 106. The LBA system 106 analyzes the message for an indication the message contains information related to an offer. For example, a message may include metadata, a tag, text or the like that indicates the message contains an offer or a location-based offer. An incoming message may indicate it is related to a location-based offer by its "To" address, its "Subject" field, its body, a tag, etc. Text, tags, etc. may be compared to predefined values to determine whether the message is to be construed as containing a location-based offer. Optionally or alternatively, semantic natural language processing may be performed on message text as part or all of this determination. For example, text may be analyzed to determine if the text contains the phrase "for sale," "wanted," "for rent," "yard sale," "carpool," "reunion" or a semantically equivalent word or phrase in English or in another language. Similarly, the text may be analyzed to determine if the text contains a reference to a geographic location, such as a merchant name, street address, city, state, zip code, telephone number or portion thereof, merchant number, geographic coordinates, intersection, neighborhood or landmark.

If a message is deemed to be related to an offer or to a location-based offer, the LBA system 106 analyzes the message for an indication of a geographic location to be associated with the offer. For example, the geographic location may be the location of a merchant's store or the location of a private yard sale. The system 106 also analyzes the message for other information about the offer, such as the name of the merchant making the offer, the nature of the offer (ex. for sale, for rent, for swap, for free, wanted to buy, roommate wanted, carpool available, employment, etc.), what is being offered, conditions of the offer, time limits and the like. The system 106 adds an entry to the location-based advertisement database 110 to store information about the offer, including a reference to the geographic location and a reference to the other information about the offer.

Users who enter, or are found to be proximate, the geographic location may subsequently be notified of the offer, such as by sending text messages or e-mail messages to the users' mobile telephones or personal computers (such as wireless tablet computers, PDAs, etc.). The text messages may include information about the offer, such as the name and address of the merchant, conditions of the offer, time limits, etc. Similarly, users who query or search the LBA database 110 (such as via a search page served by the web server 114) may be provided with information about offers that have associated geographic locations that are proximate the current or last known locations of the users or locations specified by the users, such as locations the users expect to be in the future. The querying users' locations may be automatically determined, such as by a wireless telephone network that carries the users' queries or from the Internet protocol (IP) addresses of the querying users' computers.

As used herein, unless otherwise indicated by its context, the term "merchant" means any person or organization (for-profit or non-profit) that wishes to make an offer. A merchant need not necessarily be engaged in a line of business or trade. The term "merchant" is not limited to the definition provided by the Uniform Commercial Code (UCC). An "offer" can, but need not, be a commercial offer. Offers include traditional offers for sale of goods or services in return for payment or barter or for free, with or without conditions. Offers may be offers for sale, for rent, wanted, etc. Offers also include announcements and invitations, such as announcements of blood donation events, public fireworks displays, private social events, etc. Offers may be open to everyone or to only a predefined group or class of recipients.

As used herein, unless otherwise indicated by its context, the term "social network system" includes conventional Internet-based social networking systems, such as Twitter and Facebook, as well other publicly accessible or private computer systems for posting messages for viewing by others. Examples include content-sharing web sites, such as Flickr and YouTube, bulletin board systems (BBS), Internet forums, on-line classified advertising systems, such as Craigslist, eBay, and the like. The social network system can, but need not, be dedicated to hosting offers or location-based advertisements.

As used herein, unless otherwise indicated by its context, the terms "automatic" and "automatically" mean without human intervention. Thus, an automatic search of a database occurs without being initiated by a human and without a human specifying search criteria.

Figure 2:
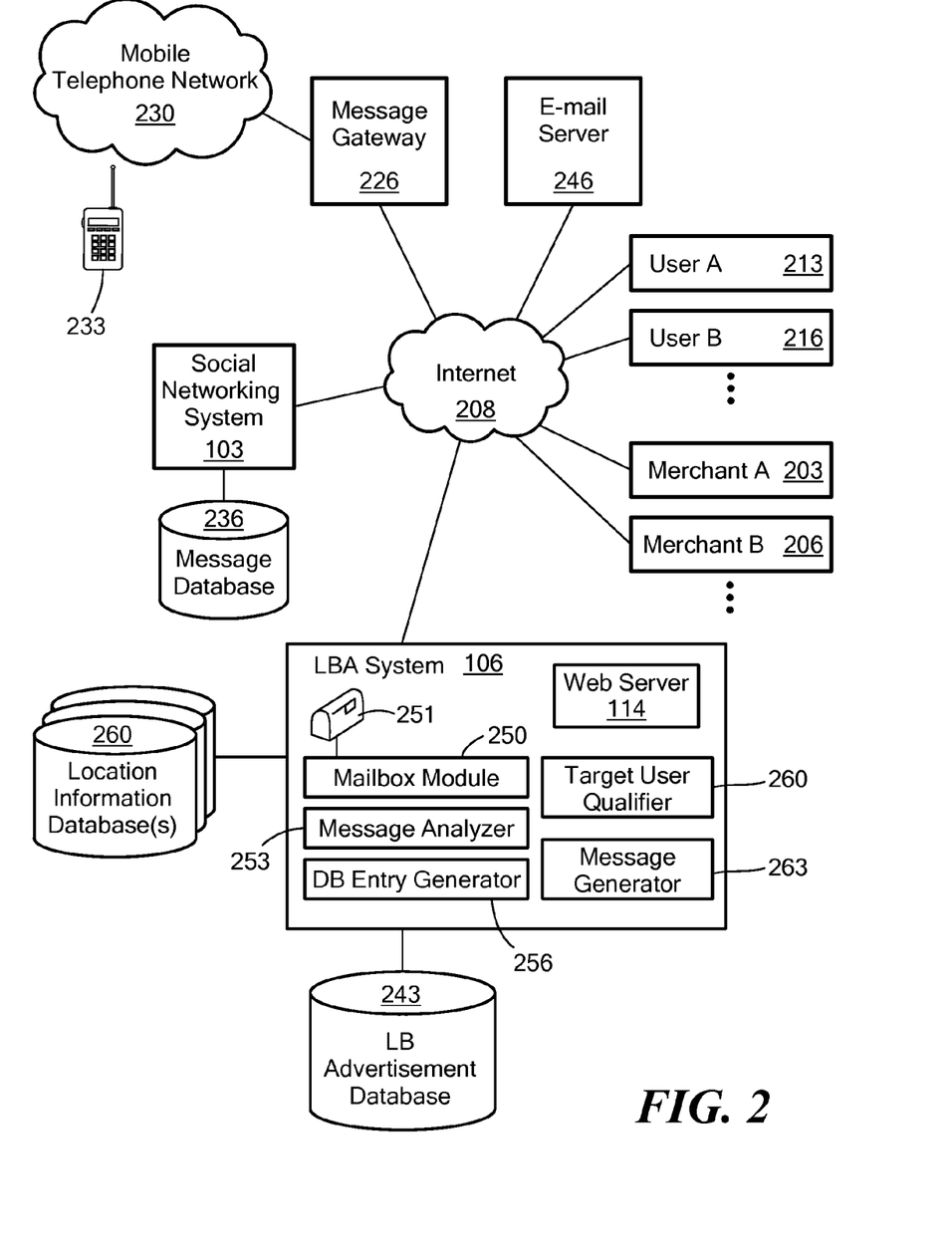
FIG. 2 is a schematic block diagram of a context in which embodiments of the present invention may be practiced.

FIG. 2 is a schematic block diagram of a context in which embodiments of the present invention may be practiced. Exemplary merchant computers A 203 and B 206 may be coupled via the Internet or another suitable network 208 to an exemplary social networking system 103. The merchants, via their computers 203 and 206, may post messages on the social networking system 103 in a conventional manner via non-merchant computers, such as user computers A 213 and B 216. Other users may also be able to post messages on the social networking system 103. A message gateway 226 may interconnect a mobile telephone network 230 and the Internet 208 to enable mobile telephones and the like, exemplified by mobile telephone 233, to access the social networking system 103 in a well-known manner. The social networking system 103 may be publicly available or private, fee-based or free, with or without requiring users to enroll or sign up to use the system 103.

Figure 3:
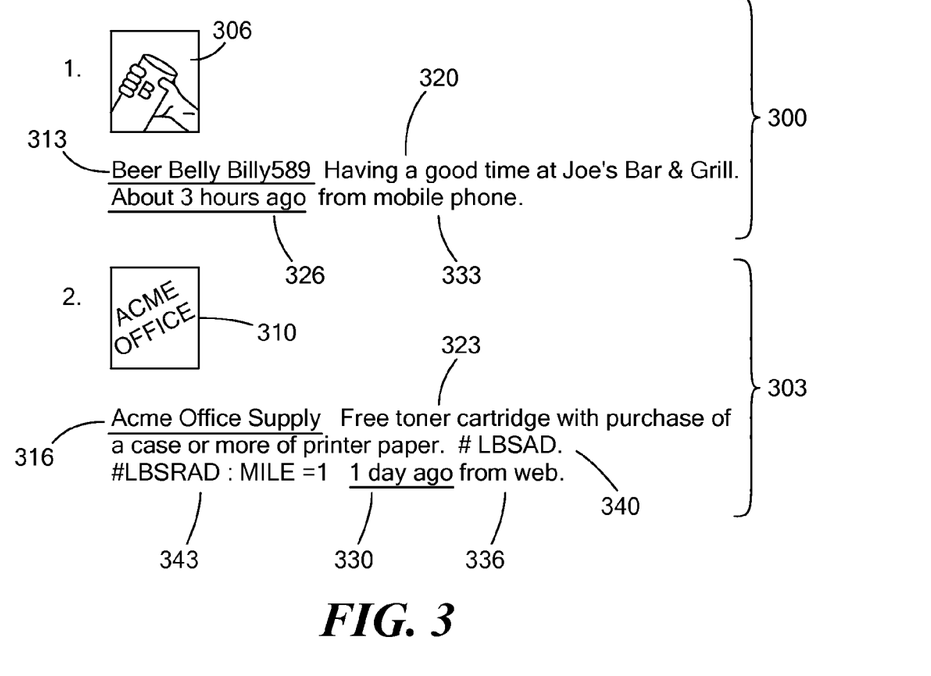
FIG. 3 is an exemplary display of two messages stored in a message database of a social networking system, according to an embodiment of the present invention.

The social networking system 103 stores the posted messages in a message database 236 and makes the messages available to users, such as users 213 and 216, of the social networking system 103. FIG. 3 is an exemplary display of two hypothetical messages 300 and 303 stored in the message database 236 (FIG. 2). The two messages 300 and 303 may be posted to (i.e., classified under) a particular user or topic, by a particular user, etc. As well known in the art, each message 300 and 303 may include: an icon 306 or 310 that represents the person or organization who or that posted the message; a user identification (i.e., a screen name or the like) 313 or 316 of the poster; text 320 or 323 of the message; an indication 326 or 330 of when the message was posted; and an indication 333 or 336 of an access method the poster used to post the message.

The first message 300 represents a typical social networking post, i.e., a post that indicates something about the poster or what the poster is currently doing or has recently done. The second message 303 represents a location-based offer by a merchant. In the second message 303, the posting merchant included a particular "hashtag" 340 to identify the message as a location-based message. Hashtags are well-known in the art. A hashtag is a keyword or term assigned to a piece of information that helps describe or categorize the information and allows the information to be found by browsing or searching for it. Typically, a hashtag is composed by prepending a hash character ("#") to a character string. Conventional hashtags are non-hierarchical; however, hashtags as described herein may be hierarchical or non-hierarchical. In one embodiment, a hashtag of "#LBSAD" or "#UNOMOBI" may be used to identify a message as being a location-based advertisement message. Optionally or alternatively, other suitable hashtags may be used to identify location-based advertisement messages.

A hashtag, such as "#ADVERT," may be used by a poster to identify a message as being an advertisement, without necessarily identifying the message as being location-based. Nevertheless, embodiments of the present invention may treat such a message in the same way location-based messages are treated, if the message contains enough information to enable the embodiments to ascertain a location for, and other information about, the offer, as described herein. Thus, for purposes of the present disclosure, the intention of a poster to post a location-based or a non-location-based message is not relevant to whether the message contains information related to a location-based offer or whether the disclosed system treats the post as a location-based message.

Instead of, or in addition to, hashtags, other identification devices may be used to identify a message as a location-based or non-location-based advertisement. For example, tags or other metadata may be used. In another example, natural language parsing of the contents of the message is used to determine if the message is, or can be treated as, a location-based advertisement. The identification may be included in the body of the message, or it may be separate from the body. The identification may, but need not, be displayed, as described in more detail below.

Returning to FIG. 2, the LBA system 106 may access the social networking system 103 via any suitable protocol to obtain messages or portions of messages. For example, the hypertext transfer protocol ("HTTP") may be used by the LBA system 106 to essentially simulate a computer executing a browser and request messages, as a user interacting with a browser would do. Optionally or alternatively, if the social networking system 103 provides an application programming interface (API), the LBA system 106 may make requests and receive data via this interface, all as well known in the art.

Figure 4:
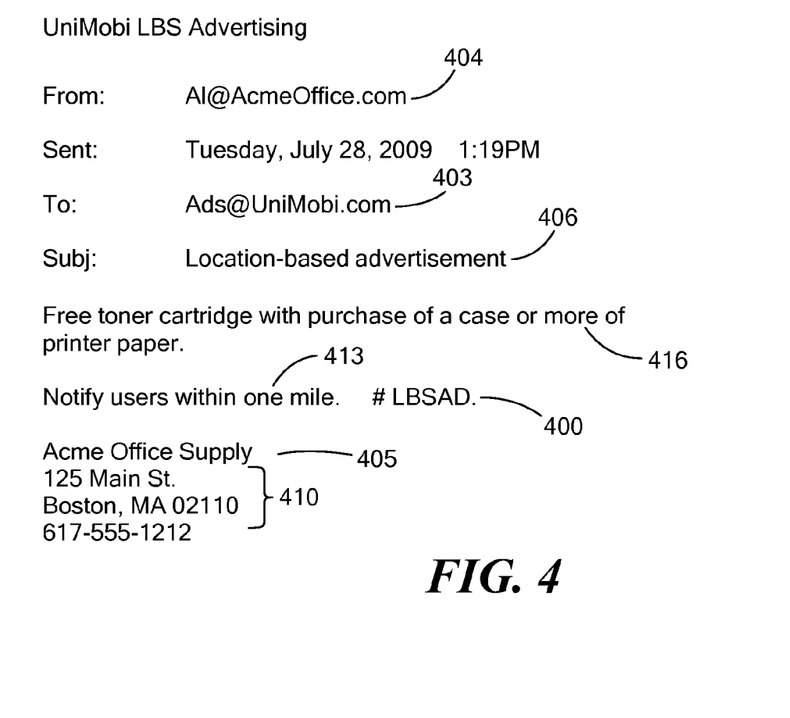
FIG. 4 contains an exemplary e-mail message that contains information about a location-based offer, according to an embodiment of the present invention.

As noted, in one mode of operation, the LBA system 106 analyzes one or more messages posted on the social networking system 103 seeking to identify messages that contain information related to offers or location-based offers, as described in more detail below. In another mode of operation, the LBA system 106 receives and analyzes messages, such as e-mail messages, sent to the LBA system 106 by merchants. The sent messages contain information about offers. FIG. 4 contains an exemplary hypothetical e-mail message that contains information about a location-based offer. Merchant B 206 (FIG. 2) may, for example, send an e-mail message via an e-mail server 246 to the LBA system 106. Optionally or alternatively, the message may be sent via the social networking system 103 or via any other suitable system.

Optionally or alternatively, the LBA system 106 may receive other types of messages, such as instant messages ("IMs") sent by user computers 213 or 216 or by a mobile telephone 233. Exemplary instant messages include short message service (SMS) text messages and multimedia messages (MMS). Exemplary IM services include mobile instant messaging (MIM), America Online Instant Messenger (AIM), ICQ, Excite, Windows Live Messenger (previously known as MSN Messenger), Ubique, Yahoo! Messenger, Skype and IBM Lotus Sametime.

The LBA system 106 includes a mailbox module 250, as is well known in the art, to receive messages. A user of the merchant computer B 206 or of the mobile telephone 233 issues an appropriate command, such as to an e-mail or IM client being executed by to the computer 206 or by the mobile telephone 233, to send the message. A mailbox 251 may be allocated for receiving messages containing offers or location-based offers from merchants. The address of this mailbox 251 may be publicized, such as on a web page served by the web server 114.

Messages posted on the social networking system 103 and messages received by the LBA system 106 via the mailbox 251 are analyzed in similar manners. The LBA system 106 includes a message analyzer 253 and a database entry generator 256. The LBA system 106 is associated with a location-based advertisement database 243. The location-based advertisement database 243 may be part of the LBA system or another system (not shown). If the message analyzer 253 identifies a message as being related to an offer or to a location-based offer, the message analyzer 253 analyzes the message for information indicative of a geographic location, such as the geographic location of the merchant making the offer. In addition, the message analyzer 253 analyzes the message for other information about the offer, such as what is being offered, conditions, etc. The database entry generator 256 generates an entry and stores the entry in the database 243. The entry includes a reference to the geographic location of the offer and other information about the offer.

The LBA system 106 may also include a target user qualifier 260 and a message generator 263. The target user qualifier 260 may access the location-based advertisement database 243 to qualify a user, based on the user's proximity to a geographic location referenced in an entry in the database 243. That is, the target user qualifier 260 may qualify a user who is currently located near a location represented by a location-based advertisement. ("Currently located" in this context refers to a location that was automatically determined in real time or in near real time or the last known location.) Optionally, the target user qualifier 260 may use other criteria stored in the location-based advertisement database 243, such as income range or other demographic information, to further qualify the user.

The message generator 263 then sends a message to the qualified user. The message may be an e-mail message, an SMS message, an MMS message or other suitable message type (collectively referred to as a "text message"). The message contains at least some of the information about the offer of the entry in the database 243. For example, the message may include the name and address of the merchant who made the offer, as well as information about what is being offered and any conditions.

As noted, users, such as user A 213 or a user of a mobile telephone 233, may query or search the location-based advertisement database 243. In such a case, the proximity of the user to the geographic location of an offer may be used to qualify the user to receive information about the offer. The user's geographic location may be determined by any suitable system, facility or combination thereof, such as the IP address of the user's 213 computer, location information provided by the mobile telephone network 230, etc. For example, a "WHOIS" query on an IP address may return the user's name and address. The WHOIS query may return location information about the user's Internet service provider, which may be used as an approximate location of the user. IP addresses are usually assigned to Internet service providers within region-based blocks. Thus, an IP address can often be used to identify a region or country from which a computer is connecting to the Internet. As noted, the LBA system 106 may include a web server 114 to facilitate the search of the location-based advertisement database 243 by the user A 213 or the user of the mobile telephone 233.

Figure 5A:
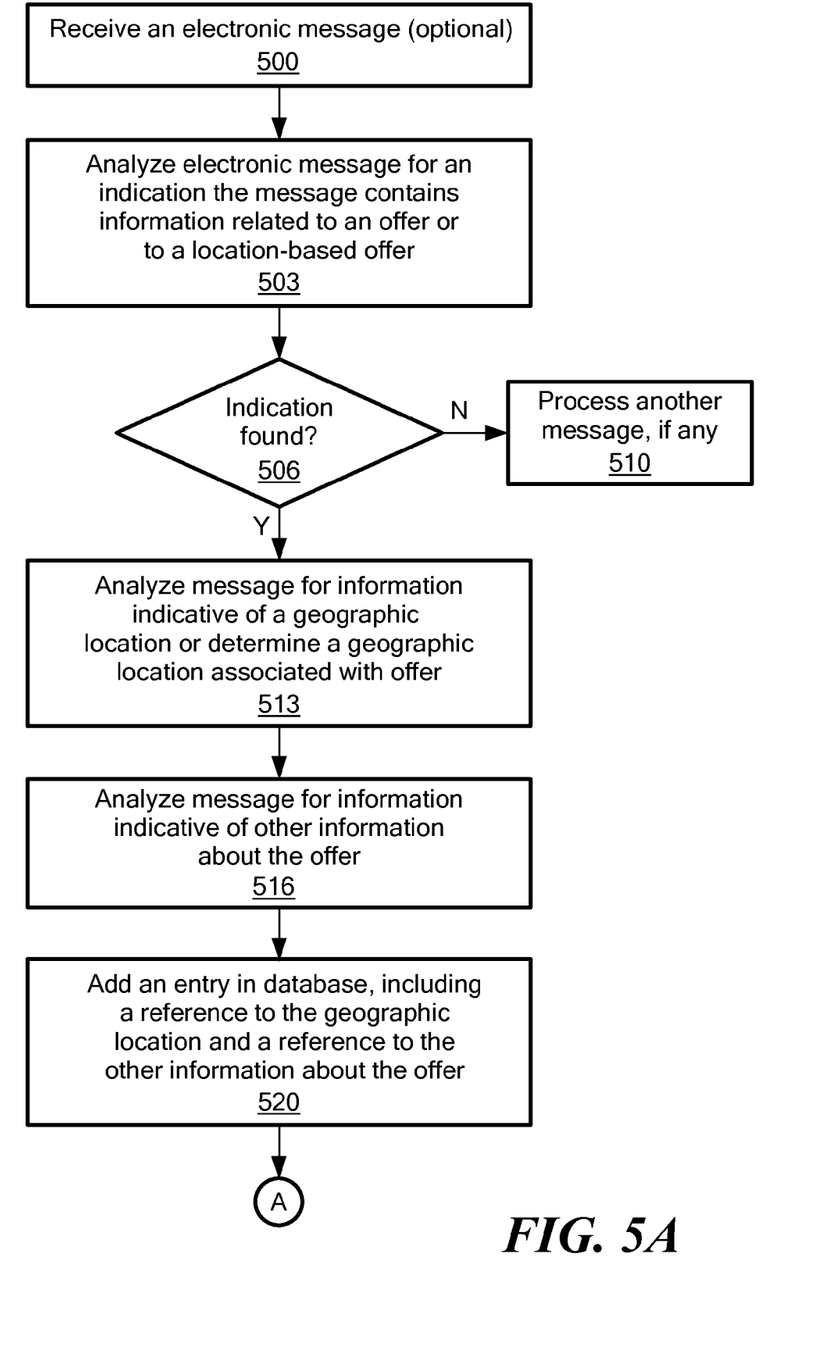
FIG. 5 contains a flowchart that describes operation of an embodiment of the present invention.
Figure 5B:
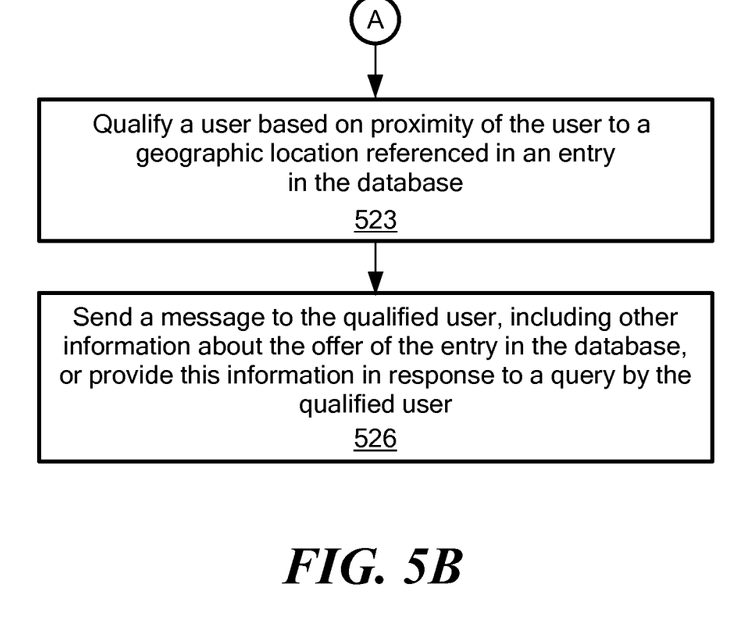

FIG. 5 contains a flowchart that describes operation of the LBA system 106. The LBA system 106 may operate in one or both of the two previously-mentioned modes. If a message, such as an e-mail message, is sent to the LBA system 106, at 500 the message is received. Whether the message is sent to the LBA system 106 or the LBA system 106 accesses a message in the social networking system 103, at 503 the message is analyzed for an indication the message contains information related to an offer or to a location-based offer (collectively an "offer"). As noted with reference to the second message 303 shown in FIG. 3, the indication may take the form of a hashtag 340, such as "#LBSAD" or "#ADVERT."

As noted, the message may include metadata, a tag, text or another device that indicates the message relates to a location-based offer. The indication need not be displayed in the body of the message. The indication need not be displayed at all, such as by the user interface provided by the social networking system 103, as long as the indication can be read by the message analyzer 253, such as via the API provided by the social networking system 103, or the message analyzer 253 can select messages based on the indication. For example, the message analyzer 253 may query the message database 236 by specifying one or more message selection criteria, such as "TAG=LBSAD," to the social networking system 103.

Returning to the exemplary e-mail message shown in FIG. 4, the indication that the message relates to an offer or to a location-based offer may occur in any suitable form, several examples of which will now be described. The message may include a hashtag 400, as discussed with respect to the message of FIG. 3. The "To" address 403 of the message may provide the indication. For example, the fact that messages are addressed to a particular user or e-mail address (such as mailbox 251) may indicate the messages contain offers or location-based offers. The "Subject" line 406 may contain a hashtag (not shown) or text that may be parsed, such as by a semantic natural language processor, for words or phrases that indicate the message relates to an offer or to a location-based offer.

The indication that the message relates to an offer or to a location-based offer may be provided by a tag or another form of metadata. E-mail messages, instant messages and the like may include tags or other forms of metadata. US Patent Application Publication No. 2009/0019120, titled "Metadata-Enhanced Instant-Messaging Applications," the contents of which are hereby incorporated by reference, describes a metadata-enhanced instant-messaging application.

Returning to the flowchart of FIG. 5, at 506, if an indication that the message relates to an offer or to a location-based offer is not found, control passes to 510, where another message is processed or the message analyzer waits to receive another message. On the other hand, if the indication is found, control passes to 513, where the message is analyzed for information indicative of a geographic location or to determine the geographic location. Users found to be proximate the location may be considered targets for location-based advertising messages.

A geographic location may be explicitly stated in the message, or the geographic location may be implied within the message. The e-mail message of FIG. 4 contains a hypothetical example 410 of an explicit geographic location, in this case a street address, city and state. The geographic location may be explicitly stated in the message in any suitable form, such as latitude and longitude coordinates, ZIP code, street address without city or state, intersection, neighborhood, landmark or telephone area code and/or exchange. In addition, the geographic location may be specified within the body of the message or elsewhere, optionally using a tag, hashtag or other metadata device. It should be noted that some explicit geographic location specifications, such as ZIP codes, define areas rather than points. For example, a street name alone specifies all locations along the named street.

The second message 303 of FIG. 3 contains an example 316 of an implied geographic location. The user identification 316 in the second message 303 may be associated with a geographic location. For example, a social networking system 103 may store a profile for the user identified by the user identification 316. The profile may include: a general geographic description, such as "Northern California;" a city and state; a full address; or some other location information, such as "Harvard University campus." The profile may include a uniform resource locator (URL) of a web page associated with the user identification 316, and this web page may contain geographic location information, such as a street address. The message analyzer 253 may use the user identification 316 to query the social networking system 103 for location information stored in the user profile or for other information, such as the URL of a web page. The message analysis 253 may include accessing the web page identified by the URL and parsing the web page's contents for information indicative of the location of the profiled user.

The message analyzer 253 may use whatever information is available in the message, from the social networking system 103, such as information from a user profile, and any other available information to more finely geographically resolve or disambiguate a geographic location. For example, if the user profile includes the URL of a web page, the message analyzer 253 may analyze the contents of the web page for geographic location information or hints thereof. Note that such analysis may involve one or more algorithms and/or heuristics. Thus, the ascertained location may not be guaranteed to be accurate.

In another example, if the message analyzer 253 has available the name of a merchant, the message analyzer 253 may be able to ascertain the geographic location of the merchant. In some embodiments, as shown in FIG. 2, the message analyzer 253 has access to a location information database 260, such as a publicly-accessible "white pages" or "yellow pages" database or Internet applications, such as AnyWho.com or Switchboard.com, a manufacturers index, such as ThomasNet, or a private or proprietary database. (Although not shown in FIG. 2, the location information database 260 may be accessible via the Internet 208.) The message analyzer 253 may use information extracted from the message and/or information provided by the social networking system 103 to look up a merchant or other entity in the location information database 260, based on the available information, such as by forming a query that includes known information about the merchant. For example, the message analyzer 253 may look up all or part of the contents of a "From" field 404, such as a domain name, or part of a signature block 405 (FIG. 4) of a message to identify the merchant and, therefore, the geographic location of the merchant. This lookup process may be performed iteratively. That is, information obtained by looking up in one database 260 may be used to look up additional information in the same or in another database 260 or elsewhere to more finely resolve the merchant's location.

If a message from a mobile telephone network or an e-mail system includes information, such as a telephone number, an IP address, a tag or other metadata, about a geographic location from which an instant message or an e-mail message is sent, the message analyzer 253 may use this information as the geographic location to be associated with the offer, or the message analyzer 253 may use the information to look up the geographic location in the database 260, as described above.

A "short code" (also known as a "short number") is a special telephone number, usually significantly shorter than a regular telephone number, that can be used to address SMS and MMS messages, as is well known in the art. A short code may be associated with the LBA system 106 through an arrangement with one or more mobile telephone carriers. The same short code may be assigned to a single LBA system 106 by several mobile telephone carriers, thereby making it easier for merchants to send messages containing offers to the LBA system 106 from the merchants' mobile telephones, regardless of which mobile telephone carrier services the merchants. That is, an operator of the LBA system 106 may publicize the short code as a convenient way to send offer messages to the LBA system 106.

As noted, when a message from a mobile telephone is received by the LBA system 106, the message contains the sender's telephone number in a "from" field. The LBA system 106 may look up this telephone number in a reverse telephone number directory, in the location information database 260 (as described above) or in another database (not shown). Thus, the LBA system 106 may determine a geographic location to associate with the offer described in the received message.

Optionally, merchants may register with the LBA system 106, such as via a web-based user interface the LBA system 106 provides via the web server 114. When a merchant registers, the merchant enters his/her mobile telephone number and a geographic location to be associated with offers described in messages the merchant may send in the future. The merchant's mobile telephone number is stored in association with the geographic location in a database (not shown) accessible by the LBA system 106.

Later, when the merchant sends a message containing an offer from his/her mobile telephone, the LBA system 106 may use the "from" telephone number of the message to query the database to find the previously-associated geographic location. The geographic location may then be associated with the offer.

Merchants who accept credit cards are typically assigned merchant numbers by acquiring banks or other financial institutions. A message may include a merchant number, such as in a hashtag "#MERCNO:VS2754." The message analyzer 253 may analyze the merchant number to determine a geographic location associated with the merchant number. For example, the message analyzer 253 may look up the merchant number in the location information database 260, or the message analyzer 253 may send a message containing the merchant number to a server (not shown) operated by the acquiring bank or by a clearing house to request information about the corresponding merchant. Furthermore, the LBA system 106 may use the merchant number to charge the merchant for the location-based advertising provided.

Optionally, the social networking system 103 may allocate merchant identification numbers or other types of merchant identifiers and associate these numbers or identifiers with merchant locations stored in the merchants' profiles. The merchants may then use the merchant identification numbers, such as with hashtags, in their messages to provide geographic location information.

Optionally, a combination of information may be used to more finely geographically resolve or disambiguate the geographic location. For example, if a telephone number and a ZIP code are available, the message analyzer 253 may ascertain a geographic location that is an intersection of the geographic location defined by the telephone number area code and exchange and the geographic location defined by the ZIP code. In another example, if a merchant's name is known, but the merchant has multiple locations, ZIP code or other information may be used to identify which of the merchant's locations are to be used for the geographic location of the location-based offer.

Optionally, the message may explicitly or implicitly specify the extent of a region, relative to the geographic location. For example, the second message 303 shown in FIG. 3 includes a hashtag "#LBSRAD:MILE=1," which may be used to specify the region as having a one-mile radius around a geographic location. This region may be used to specify how close a user must be to a geographic location in order to qualify to receive a location-based advertising message. The e-mail message of FIG. 4 provides another example 413 of an explicit specification of a region. In this case, the text "Notify users within one mile" may be processed by a semantic natural language processor. Furthermore, a geographic location specification or a region specification within a message may provide the indication that the message relates to a location-based offer. If no region extent information is included or implied in the message, a default value may be used. The default value may be automatically chosen based on the identity of the merchant, the type of offer being made or any other suitable selection criterion.

Returning to the flowchart of FIG. 5, at 516, the message is analyzed for other information about the offer. For example, text 323 of the second message 303 of FIG. 3 describes the offer as "Free toner cartridge with purchase of a case or more of printer paper." Similarly, text 416 of the e-mail message shown in FIG. 4 describes the offer.

Figure 6:
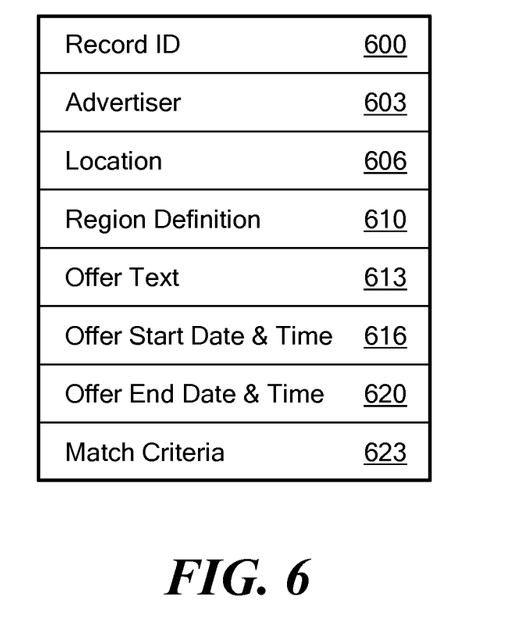
FIG. 6 is a schematic block diagram of an exemplary entry generated by an embodiment of the present invention.

Having analyzed the message for a geographic location or information indicative of a geographic location and for other information about the offer, the database entry generator 256 generates an entry and adds the entry to the location-based advertising database 243, as indicated at 520 in the flowchart of FIG. 5. FIG. 6 is a schematic block diagram of an exemplary entry generated by the database generator 256. The entry includes a record identifier 600 and a field 603 for storing an identification of the advertiser, which is typically the merchant. A location field 606 stores the geographic location associated with the offer, and a region definition field 610 defines a region, relative to the geographic location, within which users may be notified of the offer. An offer text field 613 contains a description of the offer. Other fields, such as an offer start date and time field 616, an offer end date and time field 620 and a match criteria field 623, may be used to more finely identify when and to whom location-based advertising messages should be sent.

Returning to the flowchart of FIG. 5, at 523, a target user may be qualified based on proximity of the user to a geographic location referenced in an entry in the database. Qualification of the user may be further based on the other fields 616, 620 and 623 of the entry. At 526, a message is sent to the qualified user, the message including information about the offer, such as text stored in the offer text field 613 of the entry. Optionally or alternatively, the information is provided to the qualified user in response to a query or search request from the user, such as via a web-based user interface provided by the web server 114.

Although only one social network system 103 and only one e-mail server 246 are shown in FIG. 2, the LBA system 106 may interact with multiple such systems, each in the manner described above.

In some embodiments, the LBA system 106 and it subsystems, such as the message analyzer 253 and the database entry generator 256, includes one or more processors controlled by instructions stored in memory. The memory may be random access memory (RAM), read-only memory (ROM), flash memory or any other memory, or a combination thereof, suitable for storing control software or other instructions and data. Some of the functions performed by the LBA system have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable, tangible, non-transitory storage media (e.g. read-only memory devices within a computer, such as ROM, or devices readable by a computer I/O attachment, such as CD-ROM or DVD disks), information alterably stored on writable, tangible, non-transitory storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of LBA system have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A method comprising:
automatically analyzing, by a computer system, a plurality of messages posted on a social networking computer system, each message of the plurality of messages pertaining to a respective merchant, the computer system being distinct from the social networking computer system;
identifying, by the computer system, a subset of the plurality of messages posted on the social networking computer system, wherein the subset of the plurality of messages encompasses a plurality of location-based offers;
extracting, by the computer system, a geographic location and description information of each of the location-based offers associated with the identified subset of the plurality of messages posted on the social networking computer system;
storing, by the computer system, the extracted geographic location and the description information of each of the location-based offers associated with the identified subset of the plurality of messages in a location-based advertising database distinct from the social networking computer system;
receiving, by the computer system, a geographic location of a mobile device associated with a user, the geographic location based on at least one of: an internet protocol (IP) address of the mobile device and a wireless communication network derived location of the mobile device; and
automatically generating and transmitting, by the computer system, an electronic message to the mobile device, the electronic message containing at least a portion of the description information of the location-based offer based in part on proximity of the geographic location of the mobile device associated with the user to the stored geographic location in the location-based advertising database.

2. A method according to claim 1, further comprising:
receiving a text message from a computer other than the social networking computer system;
automatically analyzing the text message for an indication the text message contains information related to an additional location-based offer;
automatically extracting description information of the additional location-based offer from contents of the text message;
automatically extracting a geographic location of the additional location-based offer; and
automatically storing the description information and the geographic location of the additional location-based offer in the location-based advertising database.

3. A method according to claim 1, wherein the automatically analyzing, by the computer system, the plurality of messages posted on the social networking computer system comprises automatically searching text of the plurality of messages posted on the social networking computer system for at least one predefined word.

4. A method according to claim 1, wherein the automatically analyzing, by the computer system, the plurality of messages posted on the social networking computer system comprises automatically searching the plurality of messages posted on the social networking computer system for at least one predefined hashtag.

5. A method according to claim 1, wherein the automatically analyzing, by the computer system, the plurality of messages posted on the social networking computer system comprises automatically searching the plurality of messages posted on the social networking computer system for at least one element of predefined metadata.

6. A method according to claim 1, wherein the extracting, by the computer system, the geographic location of each of the location-based offers comprises automatically searching text of the plurality of messages posted on the social networking computer system for at least one word indicative of a geographic location.

7. A method according to claim 1, wherein the extracting, by the computer system, the geographic location of each of the location-based offers comprises:
   querying another database, other than the social networking computer system and other than the location-based advertising database, with information from the identified subset of the plurality of messages posted on the social networking computer system; and
   receiving location data returned by the other database in response to the query.

8. A method according to claim 1, wherein the extracting, by the computer system, the geographic location of each of the location-based offers comprises, for at least one of the location-based offers:
   sending a first query to a first other database, other than the social networking computer system and other than the location-based advertising database, with information from the at least one of the location-based offers;
   receiving first information about an originator of the at least one the location-based offers, the first information being returned by the first other database in response to the first query;
   sending a second query to a second other database, other than the social networking computer system, other than the location-based advertising database and other than the first other database, with at least part of the received first information; and
   receiving location data returned by the second other database in response to the second query.

9. A method according to claim 1, wherein the automatically generating and transmitting, by the computer system, the electronic message to the mobile device comprises sending a text message to the mobile device.

10. A method according to claim 1, wherein the automatically generating and transmitting, by the computer system, the electronic message to the mobile device comprises automatically responding to an electronic query by the user.

11. A computer-based system having a processor configured to execute instructions in tangible memory, the system comprising:
   a message analyzer, executed by the processor, distinct from a social networking computer system, configured to:
      automatically analyze a plurality of messages posted on the social networking computer system, each message of the plurality of messages pertaining to a respective merchant;
      identify a subset of the plurality of messages posted on the social networking computer system, wherein the subset of the plurality of messages encompasses a plurality of location-based offers;
      extract a geographic location and description information of each of the location-based offers associated with the identified subset of the plurality of messages posted on the social networking computer system; and
      store the extracted geographic location and the description information of each of the location-based offers associated with the identified subset of the plurality of messages in a location-based advertising database distinct from the social networking computer system;
   a user qualifier, executed by the processor, distinct from the social networking computer system, configured to:
      receive a geographic location of a mobile device associated with a user, the geographic location based on at least one of: an internet protocol (IP) address of the mobile device and a wireless communication network derived location of the mobile device; and
   a message generator, executed by the processor, distinct from the social networking computer system, configured to automatically generate and transmit an electronic message to the mobile device, the electronic message containing at least a portion of the description information of the location-based offer based in part on proximity of the geographic location of the mobile device associated with the user to the stored geographic location in the location-based advertising database.

12. A system according to claim 11, wherein the message analyzer is further configured to:
   receive a text message from a computer other than the social networking computer system;
   automatically analyze the text message for an indication the text message contains information related to an additional location-based offer;
   automatically extract description information of the additional location-based offer from contents of the text message;
   automatically extract a geographic location of the additional location-based offer; and
   automatically store the description information and the geographic location of the additional location-based offer in the location-based advertising database.

13. A system according to claim 11, wherein the message analyzer is configured to automatically search text of the plurality of messages posted on the social networking computer system for at least one predefined word.

14. A system according to claim 11, wherein the message analyzer is configured to automatically search the plurality of messages posted on the social networking computer system for at least one predefined hashtag.

15. A system according to claim 11, wherein the message analyzer is configured to automatically search the plurality of messages posted on the social networking computer system for at least one element of predefined metadata.

16. A system according to claim 11, wherein the message analyzer is configured to automatically search text of the plurality of messages posted on the social networking computer system for at least one word indicative of a geographic location.

17. A system according to claim 11, wherein the message analyzer is further configured to:
   query another database, other than the social networking computer system and other than the location-based advertising database, with information from the identified subset of the plurality of messages posted on the social networking computer system; and
   receive location data returned by the other database in response to the query.

18. A system according to claim 11, wherein the message analyzer is configured to:
   send a first query to a first other database, other than the social networking computer system and other than the location-based advertising database, with information from the identified subset of the plurality of messages posted on a social networking computer system;
   receive first information about an originator of the identified subset of the plurality of messages posted on a social networking computer system, the first information being returned by the first other database in response to the first query;

send a second query to a second other database, other than the social networking computer system, other than the location-based advertising database and other than the first other database, with at least part of the received first information; and receive location data returned by the second other database in response to the second query.

19. A system according to claim 11, wherein the electronic message to the mobile device comprises a text message to the mobile device.

20. A system according to claim 11, wherein the electronic message to the mobile device comprises a message sent in response to a query by the user.

21. A computer program product for use on a computer system other than a social networking computer system, the computer system having a processor configured to execute instructions in tangible memory, the computer program product comprising:

a tangible non-transitory computer usable medium having computer readable program code stored thereon, the computer readable program code comprising program code configured, when executed by the computer system, to cause the computer system to:

automatically analyze a plurality of messages posted on the a social networking computer system, each message of the plurality of messages pertaining to a respective merchant;

identify a subset of the plurality of messages posted on the social networking computer system, wherein the subset of the plurality of messages encompasses a plurality of location-based offers;

extract a geographic location and description information of each of the location-based offers associated with the identified subset of the plurality of messages posted on the social networking computer system;

store the extracted geographic location and the description information of each of the location-based offers associated with the identified subset of the plurality of messages in a location-based advertising database distinct from the social networking computer system;

receive a geographic location of a mobile device associated with a user, the geographic location based on at least one of: an internet protocol (IP) address of the mobile device and a wireless communication network derived location of the mobile device; and automatically generate and transmit an electronic message to the mobile device, the electronic message containing at least a portion of the description information of the location-based offer based in part on proximity of the geographic location of the mobile device associated with the user to the stored geographic location in the location-based advertising database.

22. A computer program product for use on a computer system having a processor configured to execute instructions in tangible memory, the computer program product comprising:

a tangible non-transitory computer usable medium having computer readable program code stored thereon, the computer readable program code comprising:

a message analyzer, executed by the processor, distinct from a social networking computer system, configured to:

automatically analyze a plurality of messages posted on the social networking computer system, each message of the plurality of messages pertaining to a respective merchant;

identify a subset of the plurality of messages posted on the social networking computer system, wherein the subset of the plurality of messages encompasses a plurality of location-based offers;

extract a geographic location and description information of each of the location-based offer s associated with the identified subset of the plurality of messages posted on the social networking computer system; and store the extracted geographic location and the description information of each of the location-based offers associated with the identified subset of the plurality of messages in a location-based advertising database distinct from the social networking computer system;

a user qualifier, executed by the processor, distinct from a social networking computer system, configured to:

receive a geographic location of a mobile device associated with a user, the geographic location based on at least one of: an internet protocol (IP) address of the mobile device and a wireless communication network derived location of the mobile device; and a message generator, executed by the processor, distinct from a social networking computer system, configured to automatically generate and transmit an electronic message to the mobile device, the electronic message containing at least a portion of the description information of the location-based offer based in part on proximity of the geographic location of the mobile device associated with the user to the stored geographic location in the location-based advertising database.

* * * * *

UNITED STATES PATENT AND TRADEMARK OFFICE
CERTIFICATE OF CORRECTION

PATENT NO. : 9,679,311 B2  Page 1 of 1
APPLICATION NO. : 12/849078
DATED : June 13, 2017
INVENTOR(S) : Marvin Igelman et al.

It is certified that error appears in the above-identified patent and that said Letters Patent is hereby corrected as shown below:

In the Claims

In Column 19, Line 28:
Delete "a"

In Column 20, Line 25:
Delete "s"

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*